United States Patent [19]

Kaya et al.

[11] Patent Number: 4,612,621

[45] Date of Patent: Sep. 16, 1986

[54] DISTRIBUTED SYSTEM FOR OPTIMIZING THE PERFORMANCE OF A PLURALITY OF MULTI-STAGE STEAM TURBINES USING FUNCTION BLOCKS

[75] Inventors: Azmi Kaya, Akron; Marion A. Keyes, IV, Chagrin Falls, both of Ohio

[73] Assignee: The Babcock & Wilcox Company, New Orleans, La.

[21] Appl. No.: 476,088

[22] Filed: Mar. 17, 1983

[51] Int. Cl.$^4$ .................. G05B 13/02; G06F 15/46
[52] U.S. Cl. ........................... 364/494; 60/667; 364/148; 364/152
[58] Field of Search ............ 60/660, 663, 667, 39.03; 290/521, 40; 364/148, 152, 492, 494, 495

[56] References Cited

U.S. PATENT DOCUMENTS

| | | | |
|---|---|---|---|
| 3,812,377 | 5/1974 | Malone | 60/660 |
| 4,027,145 | 5/1977 | McDonald et al. | 364/494 |
| 4,069,675 | 1/1978 | Adler et al. | 60/667 |
| 4,074,357 | 2/1978 | Gupta et al. | 364/494 |
| 4,179,742 | 12/1979 | Stern et al. | 60/660 |
| 4,222,229 | 9/1980 | Uram | 60/39.03 |
| 4,271,473 | 6/1981 | Ross | 364/494 |
| 4,297,848 | 11/1981 | Silvestri, Jr. | 60/663 |
| 4,403,293 | 9/1983 | Bradt et al. | 364/494 |
| 4,410,950 | 10/1983 | Toyoda et al. | 364/492 |
| 4,412,136 | 10/1983 | Kaya et al. | 364/494 |
| 4,418,541 | 12/1983 | Russell | 60/667 |
| 4,430,573 | 2/1984 | Kaya et al. | 290/40 R |

*Primary Examiner*—Felix D. Gruber
*Attorney, Agent, or Firm*—Vytas R. Matas; Robert J. Edwards

[57] ABSTRACT

A system for optimizing the performance of a plurality of energy conversion devices is disclosed. Measurements of fluid flow into and out of the energy conversion devices, the efficiencies of the conversion devices and the power produced by the conversion devices are used as inputs to function blocks in a logic arrangements. The function blocks cause a decrease in load demand to be applied to the energy conversion device having the lowest efficiency and an increase in load demand to be applied to the energy conversion device having the highest efficiency.

5 Claims, 9 Drawing Figures

SIMILARLY FOR: $\check{F}_{2m}, \hat{F}_{2m}, \check{F}_{2t}, \hat{F}_{2t}, \check{F}_{pm}, \hat{F}_{pm}, \check{F}_{w1}, \hat{F}_{w1}, \check{F}_{w2}, \hat{F}_{w2}$

G = LARGE POSITIVE NUMBER

DISTRIBUTED SYSTEM FOR OPTIMIZING THE PERFORMANCE OF A PLURALITY OF MULTI-STAGE STEAM TURBINES USING FUNCTION BLOCKS

TECHNICAL FIELD

The present invention relates generally to a system for optimizing the performance of a plurality of energy conversion devices, such as turbines, and more particularly to a system which optimizes the operation of these devices by means of fixed function blocks.

BACKGROUND ART

Typically, optimization of the performance of a plurality of energy conversion devices, such as turbines, is achieved only through the use of computers and extensive computer programs. Such computer systems have some inherent disadvantages. For example, the computer programs usually use a "high level" language which requires expensive hardware and software to implement. Such a "high level" language usually results in a relatively long processing time for determining operation optimization. In addition, such computer systems typically require highly trained personnel to program and operate same. Thus, the computer system that is required for the optimization calculations is very costly to install and operate, and may not react to changes in the operation of the turbines as rapidly as desired.

Because of the foregoing, it has become desirable to develop a system for optimizing the operation of a plurality of turbines or other energy conversion devices without the use of a computer system.

SUMMARY OF THE INVENTION

The present invention solves the aforementioned problems associated with the prior art as well as other problems by utilizing function blocks having fixed functional relations to provide the calculating features, which are generally only available through the use of computers, to determine the manner in which the turbines should be loaded to effect optimization of the overall system. Measurements of fluid flow into and out of the turbines, the power produced by the turbines, and the efficiencies of the turbine stages are processed through the use of function blocks to determine the efficiencies of the extraction flows. When there is a decrease in load demand, the load is assigned to the extraction flow with the lowest overall efficiency, whereas when there is an increase in load demand, the load is assigned to the extraction flow with the highest efficiency. In this manner, the efficiency of the overall system is optimized.

DESCRIPTION OF THE PREFERRED EMBODIMENT

Figure 1:
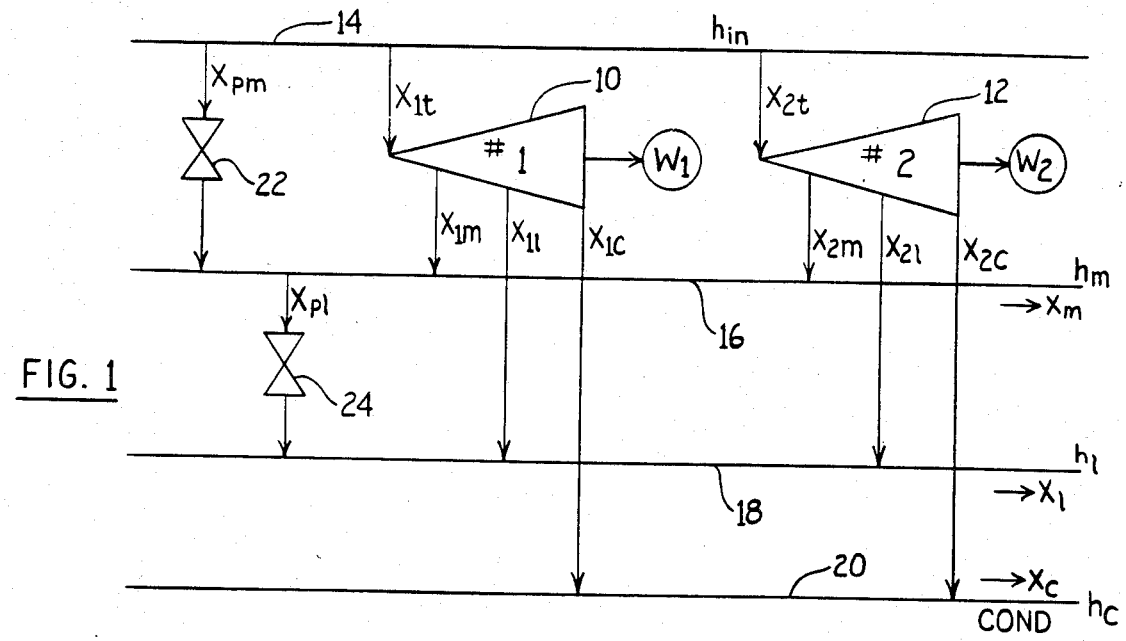
FIG. 1 is a schematic diagram of a system comprising two turbines whose operation are to be optimized.

Referring now to the drawings where the illustrations are for the purpose of describing the preferred embodiment of the present invention and are not intended to limit the invention thereto, FIG. 1 is a schematic diagram of a pair of multi-stage turbines 10, 12 showing their respective connections to an input steam supply conduit 14, extraction flow conduits 16, 18, and to a steam condenser conduit 20. By-pass valves 22, 24 are provided between the supply conduit 14 and extraction flow conduit 16, and between the extraction flow conduits 16 and 18, respectively. In one instance the objective is to optimize performance of the turbines 10, 12 based upon steam demand. In this case, the demands of the extraction flows $X_m$ and $X_l$ of conduits 16 and 18 are specified and the power outputs $W_1$ and $W_2$ of the respective turbines 10, 12 are optimized so as to achieve the maximum output power $(W = W_1 + W_2)$ therefrom. In this instance, during normal operating conditions the extraction flow $X_c$ through conduit 20 and the steam flows $X_{pm}$ and $X_{pl}$ through valves 22 and 24, respectively should be zero. When the extraction flows from the turbines 10, 12 reach their limits, any additional steam demands are met by the opening of the by-pass valves 22 and 24. In the other instance, the objective is to optimize performance of the turbines 10, 12 based upon megawatt demand. In this case, the megawatt demand $W = W_1 + W_2$ is specified and the overall steam usage is minimized while the steam needs of $X_m$ and $X_l$ of conduits 16 and 18 are satisfied. In this instance, during normal operating conditions the steam flows $X_{pm}$ and $X_{pl}$ through valves 22 and 24, respectively should be zero. Here again, when the extraction flows from the turbines 10, 12 reach their limits, any additional steam demands are satisfied by the opening of the valves 22 and 24.

Figure 2:
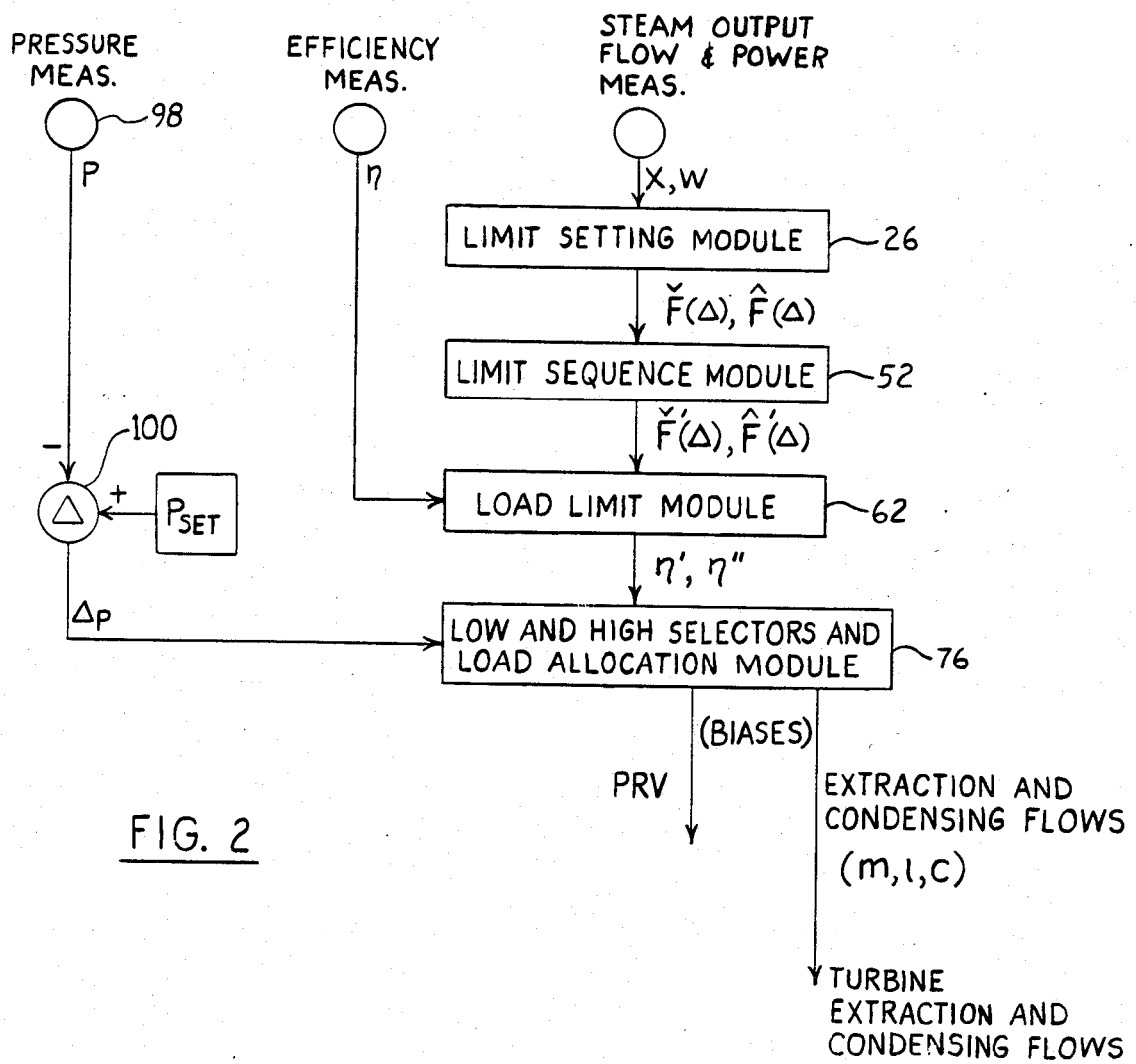
FIG. 2 is a schematic diagram of the logic utilized by the invention of this disclosure to effect optimization of the system illustrated in FIG. 1.
Figure 3:
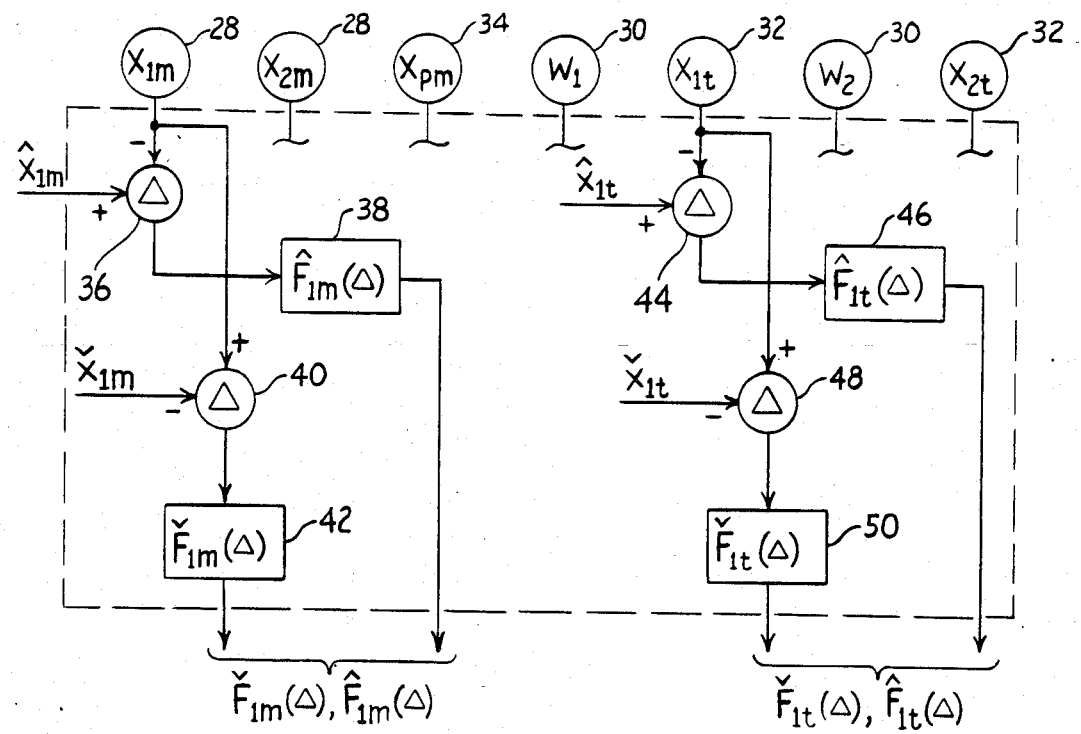
FIG. 3 is a schematic diagram of the function blocks which comprise the limit setting module of FIG. 2.
Figure 4:
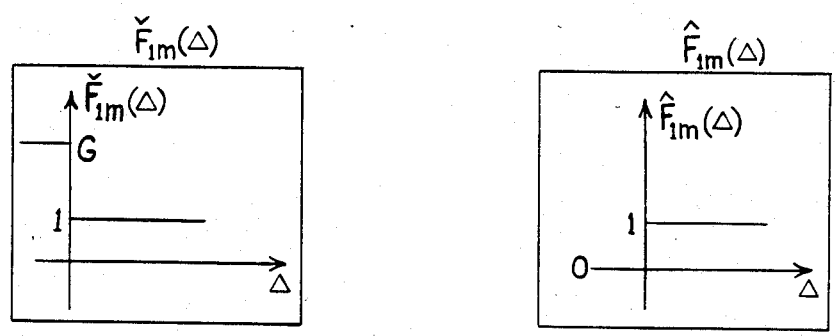
FIG. 4 is a plurality of graphs illustrating the output of the function generators illustrated in FIG. 3.
Figure 4:
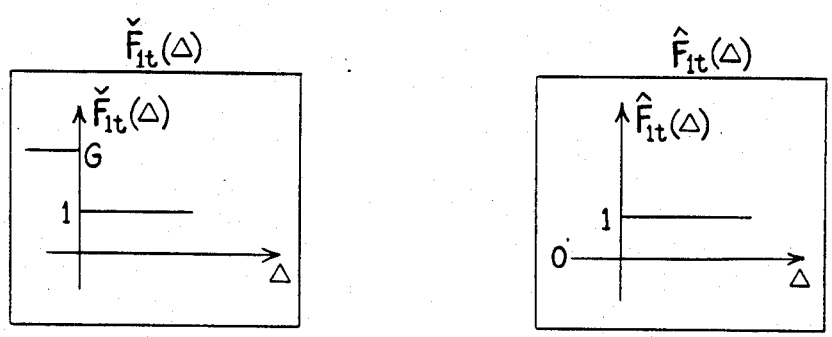

Referring now to FIG. 2, which is a schematic diagram of the logic utilized to effect optimization of the operation of the turbines, measurements of steam flow X and power output W are used as inputs to a limit setting module 26. The function blocks comprising this module 26 are shown in FIG. 3. In this Figure, flow transmitters 28 are provided to measure the output flows $X_{1m}, X_{2m} \ldots$ from each stage of the turbines 10, 12 and power transmitters 30 are provided to measure the respective output power $W_1, W_2$ produced by each of these turbines. In addition, flow transmitters 32 and 34 are provided to measure the flow into the turbines and through the by-pass valves, respectively. Considering only the turbine 10, the output flow from the first stage thereof, i.e., output flow $X_{1m}$, as measured by flow transmitter 28, is applied to the negative input to a subtraction function block 36. The other input to the subtraction function block 36, which is applied to the positive input thereto, is a preset maximum limit for output flow from this turbine stage. The output of this subtraction function block 36 is used as the input to a function generator 38 which produces an output signal $\check{F}_{1m}(\Delta)$, as shown in FIG. 4, equal to zero when the output of the subtraction function block 36 is negative, thus indicating that the output flow from the first turbine stage is above the preset maximum limit, and produces an output signal $\check{F}_{1m}(\Delta)$ equal to positive one when the output of the function block 36 is positive, this indicating that the output flow from the first turbine stage is below the preset maximum limit.

The output flow from the first stage of turbine 10, i.e., output flow $X_{1m}$, as measured by flow transmitter 28, is also applied to the positive input to a subtraction function block 40. The other input to this function block 40 is a preset minimum limit for output flow from this turbine stage, and this minimum limit is applied to the negative input to this function block 40. The output of this function block is used as the input to a function generator 42 which produces an output signal $\hat{F}_{1m}(\Delta)$, as shown in FIG. 4, equal to a large positive number G when the output of the subtraction function block 40 is negative, this indicating that the output flow from the first turbine stage is below the preset minimum limit, and produces an output signal $\hat{F}_{1m}(\Delta)$ equal to positive one when the output of the function block 40 is positive, thus indicating that the output flow from the first turbine stage is above the preset minimum limit.

Again considering only turbine 10, the input flow thereto, i.e., $X_{1t}$, as measured by the flow transmitter 32, is applied to the negative input to a subtraction function block 44. The other input to this function block 44, which is applied to the positive input thereto, is a preset maximum limit for input flow into this turbine. The output of this function block 44 is used as the input to a function generator 46 which produces an output signal $\check{F}_{1t}(\Delta)$, as shown in FIG. 4, equal to zero when the output of the subtraction function block 46 is negative, thus indicating that the input flow into the turbine 10 is above the preset maximum limit, and produces an output signal $\check{F}_{1t}(\Delta)$ equal to positive one when the output of the function block 46 is positive, thus indicating that the input flow to the turbine 10 is below the preset maximum limit.

The input flow to the turbine 10, i.e., $X_{1t}$, as measured by the flow transmitter 32, is also applied to the positive input to a subtraction function block 48. The other input to this function block 48 is a preset minimum limit for input flow to this turbine 10, and this minimum limit is applied to the negative input to this function block 48. The output of this function block 48 is used as the input to a function generator 50 which produces an output signal $\hat{F}_{1t}(\Delta)$, as shown in FIG. 4, equal to a large positive number G when the output of the subtraction function block 48 is negative, thus indicating that the input flow into the turbine 10 is below the preset minimum limit, and produces an output signal $\hat{F}_{1t}(\Delta)$ equal to positive one when the output of the function block 48 is positive, thus indicating that the input flow into the turbine is above the preset minimum limit.

As noted in FIG. 3, the foregoing approach can be used to find $\check{F}_{2m}(\Delta)$ and $\hat{F}_{2m}(\Delta)$ for the output flow from the first stage of turbine 12, $\check{F}_{2t}(\Delta)$ and $\hat{F}_{2t}(\Delta)$ for the input flow to turbine 12, $\check{F}_{pm}(\Delta)$ and $\hat{F}_{pm}(\Delta)$ for the flow through by-pass valve 22, $\check{F}_{w1}(\Delta)$ and $\hat{F}_{w1}(\Delta)$ for the power produced by turbine 10, and $\check{F}_{w2}(\Delta)$ and $\hat{F}_{w2}(\Delta)$ for the power produced by turbine 12. In each case, if the parameters are within the preset limits, the foregoing output signals are equal to positive one.

Figure 5:
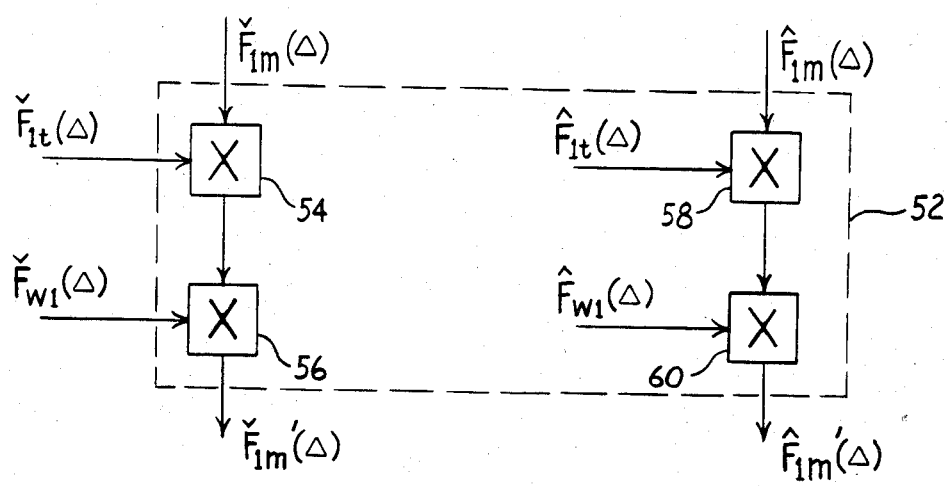
FIG. 5 is a schematic diagram of the function blocks which comprise the limit sequence module of FIG. 2.

Referring to FIG. 2, the foregoing output signals produced by the limit setting module 26 are applied as inputs to a limit sequence module 52. The function blocks comprising this limit sequence module 52 are shown in FIG. 5. As shown in this Figure, the output signal $\check{F}_{1m}(\Delta)$ produced by the function generator 42 is used as an input to a multiplication function block 54 whose other input is the output signal $\check{F}_{1t}(\Delta)$ produced by the function generator 50. The output signal produced by the multiplication function block 54 is used as an input to a multiplication function block 56 whose other input is the signal $\check{F}_{w1}(\Delta)$ which represents the low limit for the power produced by the turbine 10. Similarly, the output signal $\hat{F}_{1m}(\Delta)$ produced by the function generator 38 is used as an input to a multiplication function block 58 whose other input is the output signal $\hat{F}_{1t}(\Delta)$ produced by the function generator 46. The output signal produced by the multiplication function block 58 is used as an input to a multiplication function block 60 whose other input is the signal $\hat{F}_{w1}(\Delta)$ which represents the high limit for the power produced by the turbine 10.

Assuming that the input flow to the turbine and the power produced by the turbine are within the preset maximum and minimum limits, i.e., input signals $\check{F}_{1t}(\Delta)$, $\hat{F}_{1t}(\Delta)$, $\check{F}_{w1}(\Delta)$ and $\hat{F}_{w1}(\Delta)$ are all equal to a positive one, then the output signals produced by multiplication function blocks 56 and 60 are as follows:

| Output of Function Block 56 [$F_{1m}(\Delta)$] | Output of Function Block 60 [$F_{1m}(\Delta)$] | Condition |
|---|---|---|
| G | 1 | $X_{1m} \leq \check{X}_{1m}$ |
| 1 | 1 | $\check{X}_{1m} < X_{1m} < \hat{X}_{1m}$ |
| 1 | 0 | $\hat{X}_{1m} \leq X_{1m}$ |

It should be noted that the foregoing analysis, with similar results, can be obtained for $\check{F}_{2m}(\Delta)$ and $\hat{F}_{2m}(\Delta)$ for the output flow from the first stage of the turbine 12.

Figure 6:
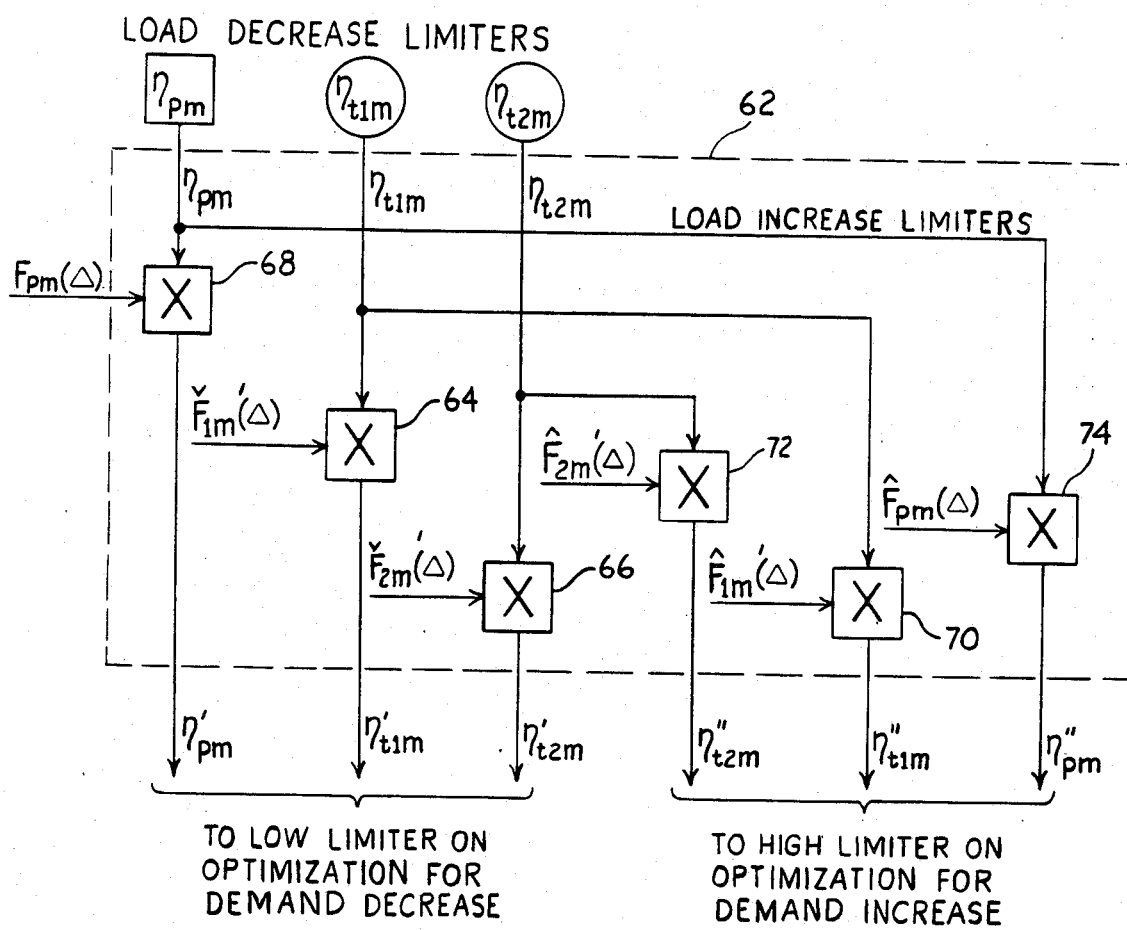
FIG. 6 is a schematic diagram of the function blocks which comprise the load limit module of FIG. 2.

As shown in FIG. 2, the foregoing output signals produced by the limit sequence module 52 are used as inputs to a load limit module 62. The function blocks comprising this load limit module 62 are shown in FIG. 6. As shown in this Figure, the output signal $\check{F}'_{1m}(\Delta)$ produced by the multiplication function block 56 is used as an input to a multiplication function block 64 whose other input is the efficiency $\eta_{t1m}$ of the first stage of the turbine 10 causing a signal $\eta'_{t1m}$ to be produced at the output thereof. Similarly, the output signal $\check{F}'_{2m}(\Delta)$ is used as an input to a multiplication function block 66 whose other input is the efficiency $\eta_{t2m}$ of the first stage of the turbine causing a signal $\eta'_{t2m}$ to be produced at the output thereof. And lastly, the signal $\check{F}_{pm}(\Delta)$ is used as an input to a multiplication function block 68 whose other input is the efficiency $\eta_{pm}$ of the by-pass valve 22 causing a signal $\eta'_{pm}$ to be produced at the output thereof. The foregoing output signals $\eta'_{t1m}$, $\eta'_{t2m}$, and $\eta'_{pm}$, represent load decrease limiters on demand decrease.

The first stage efficiency $\eta_{t1m}$ of the turbine 10 is also used as an input to a multiplication function block 70 whose other input is the output signal $\hat{F}'_{1m}(\Delta)$ produced by the multiplication function block 60 causing a signal $\eta''_{t1m}$ to be produced at the output thereof. Similarly, the first stage efficiency $\eta'_{t2m}$ of the turbine 12 is also used as an input to a multiplication function block 72 whose other input is the signal $\hat{F}'_{2m}(\Delta)$ causing a signal $\eta''_{t2m}$ to be produced at the output thereof. And lastly, the efficiency $\eta'_{pm}$ of the by-pass valve 22 is also used as an input to a multiplication function block 74 whose other input is the signal $\hat{F}_{pm}(\Delta)$ causing a signal $\eta''_{pm}$ to be produced at the output thereof. The foregoing output signals $\eta''_{t1m}$, $\eta''_{t2m}$ and $\eta''_{pm}$, represent load increase limiters on demand increase.

Figure 7:
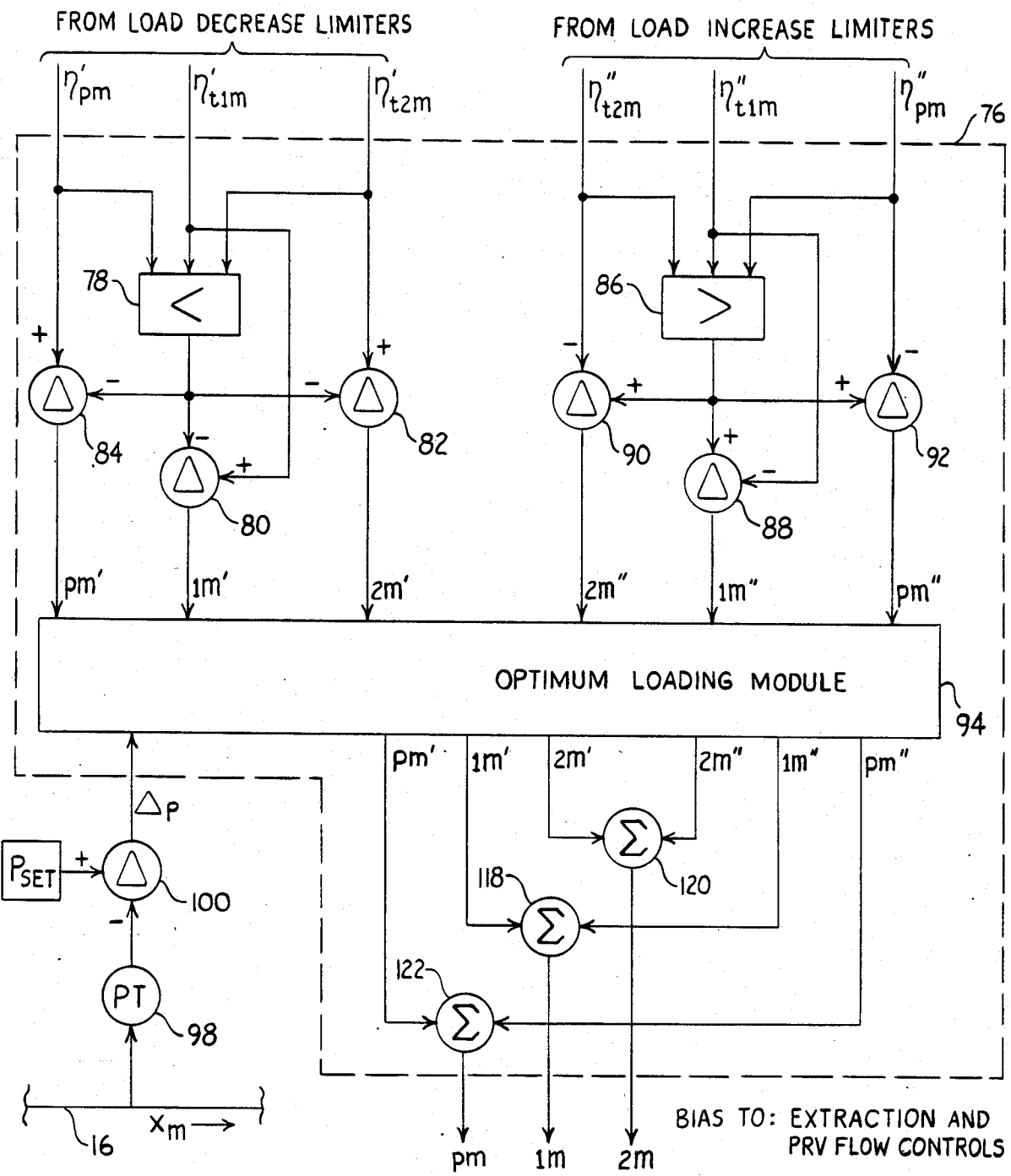
FIG. 7 is a schematic diagram of the function blocks which comprise the low and high selectors and load allocation module of FIG. 2.

Again referring to FIG. 2, the foregoing output signals produced by the load limit module 62 are used as inputs to a low and high selector and load allocation module 76. The function blocks comprising this low and high selector and load allocation module 76 are shown in FIG. 7. As illustrated in this Figure, the output signals $\eta'_{t1m}$, $\eta'_{t2m}$ and $\eta'_{pm}$ produced by multiplication function blocks 64, 66 and 68, respectively are used as inputs to a low limit function block 78 which produces an output signal equal to the smallest of the foregoing input signals. This output signal is then applied to the negative inputs to subtraction function blocks 80, 82 and 84 whose positive inputs are connected to the outputs of multiplication function blocks 64, 66 and 68, respectively. In this manner, the value of the smallest of the foregoing input signals, $\eta'_{t1m}$, $\eta'_{t2m}$ and $\eta'_{pm}$, is subtracted from each of these input signals to produce a signal $1'_m$, $2'_m$ and pm' at the output of subtraction function blocks 80, 82 and 84, respectively. Inasmuch as the value of the smallest input signal is subtracted from each of the input signals, one of the output signals, $1'_m$, $2'_m$ and pm', will be zero, while the other two output signals will be positive. The output signal which is zero will be associated with the turbine stage or by-pass valve having the lowest efficiency. Similarly, the output signals $\eta''_{t1m}$, $\eta''_{t2m}$ and $\eta''_{pm}$ produced by multiplication function blocks 70, 72 and 74, respectively are used as inputs to a high limit function block 86 which produces an output signal equal to the largest of the foregoing input signals. This output signal is then applied to the positive inputs to subtraction function blocks 88, 90 and 92 whose negative inputs are connected to the outputs of multiplication function blocks 70, 72 and 74, respectively. In this manner, each of the input signals, $\eta''_{t1m}$, $\eta''_{t2m}$ and $\eta''_{pm}$, is subtracted from the largest of these signals to produce a signal 1m'', 2m'' and pm'' at the output of subtraction function blocks 88, 90 and 92, respectively. Inasmuch as each of the input signals is subtracted from the largest of the input signals, one of the output signals, 1m'', 2m'' or pm'', will be zero while the other two output signals will be positive. The output signal which is zero will be associated with the turbine stage or by-pass valve having the highest efficiency.

Figure 8:
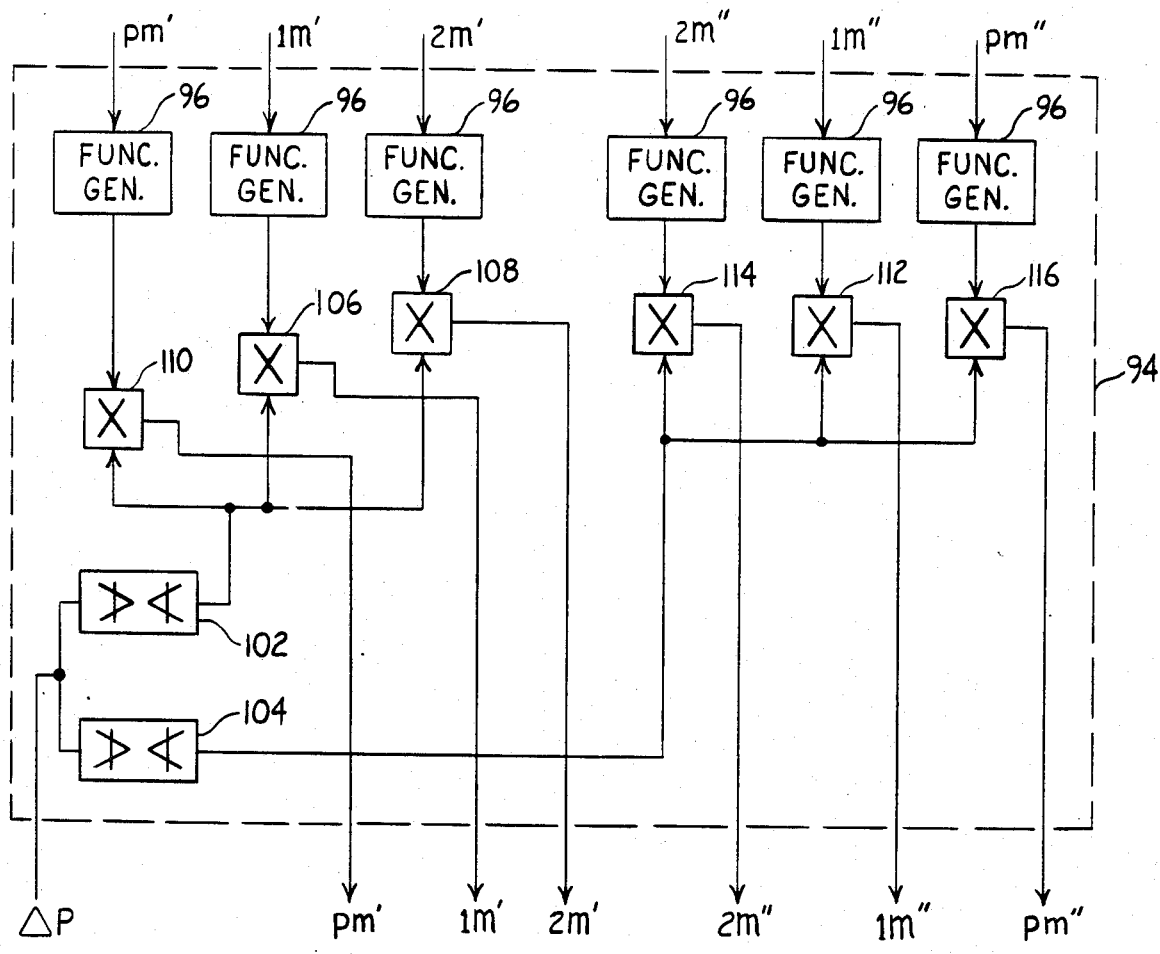
FIG. 8 is a schematic drawing of the function blocks which comprise the optimum loading module of FIG. 7.
Figure 9:
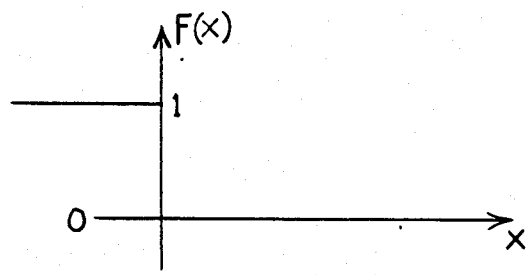
FIG. 9 is a graph illustrating the output of the function generator illustrated in FIG. 8.

The low and high selector and load allocation module 76 also includes an optimum loading module 94, and the foregoing output signals, 1m', 2m', pm', 1m'', 2m'' and pm'' are used as inputs thereto. The function blocks comprising this optimum loading module 94 are shown in FIG. 8. As shown in this Figure, each of the foregoing input signals is used as an input to a separate function generator 96 which produces an output as shown in FIG. 9. If the input signal into the generator 96 is zero, the generator produces a positive one output signal, however, if the input signal is positive, the generator produces a zero output signal. Thus, because of the previous logic employed, the smallest of the input signals, 1m', 2m' and pm', will cause a positive one to be produced at the output of the respective function generator 96 while the remaining input signals will cause a zero to be produced at the output of the respective function generator 96. Similarly, because of the logic employed, the largest of the input signals, 1m'', 2m'' and pm'', will cause a positive one to be produced at the output of the respective function generator 96 while the remaining two input signals will cause a zero to be produced at the output of the respective function generators 96.

Referring again to FIG. 7, a pressure transmitter 98 is provided to measure the pressure of the extraction flow conduit 16. The output of the pressure transmitter 98 is connected to the negative input to a subtraction function block 100 whose positive input is connected to a preset desired pressure. The output ($\Delta p$) of the function block 100 becomes positive on a steam demand increase and negative on a steam demand decrease. This output ($\Delta p$) of block 100 is connected to the input to the high and low limiters 102 and 104, shown in FIG. 8. High and low limiter 102 permits the input $\Delta p$ as output for a negative $\Delta p$ and limits the output to zero for other values of $\Delta p$ input representing a steam demand decrease. In contrast, high and low limiter 104 permits the input $\Delta p$ as output for a positive $\Delta p$ input and limits the output to zero for other values of input $\Delta p$ representing a steam demand increase. The output of limiter 102 is connected to the inputs to multiplication function blocks 106, 108 and 110 which are connected to the function generators 96 for the input signals 1m', 2m' and pm'. Similarly, the output of limiter 104 is connected to the inputs to multiplication function blocks 112, 114 and 116 which are connected to the function generators 96 for the input signals 1m'', 2m'', and pm''. In this manner, the smallest of the input signals, 1m', 2m' and pm', will cause a positive $\Delta p$ to be produced at the output of the multiplication function block (106, 108 or 110) to which it is the input while a zero is produced at the output of the two remaining function blocks. Similarly the smallest of the input signals, 1m'', 2m'' and pm'', will cause a positive $\Delta p$ to be produced at the output of the multiplication function block (112, 114 or 116) to which it is the input while a zero is produced at the output of the two remaining function blocks. As shown in FIG. 7, output signals 1m' and 1m'' produced by multiplication function blocks 106 and 112, respectively are used as inputs to a summation function block 118 which produces a signal 1m at its output; output signals 2m' and 2m'' produced by multiplication function blocks 108 and 114, respectively are used as inputs to a summation function block 120 which produces a signal 2m at its output; and output signals pm' and pm'' produced by multiplication function blocks 110 and 116, respectively are used as inputs to a summation function block 122 which produces a signal pm at its output. The foregoing output signals, 1m, 2m and pm, are subsequently used as biases for the extraction flows from the turbines 10 and 12 and through the by-pass valve 22. From the foregoing, it is apparent, that in the case of a decrease in load demand, the load is assigned to the extraction flow with the lowest overall efficiency, whereas in the case of an increase in load demand, the load is assigned to the extraction flow with the highest efficiency. The foregoing analysis was based on optimization on steam demand, however, a similar analysis can be undertaken based on megawatt demand with analogous results other than the resulting bias signals will be used to regulate the flow of fluid through the condenser.

Certain modifications and improvements will occur to those skilled in the art upon reading the foregoing. It will be understood that all such improvements and modifications have been deleted herein for the sake of conciseness and readability, but are properly within the scope of the following claims.

We claim:

1. A distributed system for optimizing the performance of a plurality of multi-stage steam turbines comprising:

means for measuring the steam output flow from the multi-stages of said steam turbines and establishing a series of steam output signals;

means for measuring the output power produced by said steam turbines and establishing a series of output power signals;

limit setting means responsive to said series of output power signals and said series of steam output signals for establishing a logic 1 signal if said steam output and output power signals are within preset limits and a logic 0 signal if said steam output and output power signals are not within preset limits;

limit sequencing means responsive to said logic signals of said limit setting means for establishing either a logic 1 signal, a logic 0 signal, or a high level output signal G;

means for measuring the efficiency of each of the multi-stages of said steam turbines and establishing a series of efficiency signals;

means establishing a load increase limit signal in response to output signals from said efficiency measuring means and said limit sequencing means;

pressure measuring means for measuring the pressure of the outputs of said turbines and establishing a signal indicative thereof; and load allocation means responsive to the output signal from said pressure measuring means and said load increase limit establishing means for assigning a decrease in load demand to the lowest efficiency turbine and an increase in load demand to the highest efficiency turbine.

2. The system as defined in claim 1 wherein each of the turbines has one or more output stages and wherein a decrease in load demand is applied to the turbine output stage having the lowest efficiency of all of the output stages and an increase in load demand is applied to the turbine output stage having the highest efficiency of all of the output stages.

3. The system as defined in claim 1 wherein said change in load demand involves a change in steam output demand for the system.

4. The system as dined in claim 1 wherein said change in load demand involves a change in electrical output demand for the system.

5. The system as defined in claim 1 wherein said allocating means comprises one or more function blocks arranged in a logic configuration.

* * * * *